United States Patent [19]
Harbolt et al.

[11] Patent Number: 4,966,736
[45] Date of Patent: Oct. 30, 1990

[54] PROCESS FOR PREPARING SULFUR HAVING UNIFORM PARTICLE SIZE DISTRIBUTION

[75] Inventors: Bruce Harbolt, Northridge; James T. Saake, Los Angeles, both of Calif.

[73] Assignee: Union Oil Company of California, Los Angeles, Calif.

[21] Appl. No.: 115,608

[22] Filed: Oct. 30, 1987

[51] Int. Cl.$^5$ .............................. B29B 9/10
[52] U.S. Cl. ............................ 264/11; 425/7
[58] Field of Search ............ 264/5, 11, 12, 13, 14, 264/37; 425/6, 7, 10

[56] References Cited

U.S. PATENT DOCUMENTS

| | | | |
|---|---|---|---|
| 3,334,159 | 8/1967 | Campbell | 425/6 |
| 3,891,730 | 6/1975 | Wessel et al. | 264/11 |
| 3,963,811 | 6/1976 | Tamura et al. | 264/11 |
| 4,024,210 | 5/1977 | Chalmers | 264/11 |
| 4,389,356 | 6/1983 | Higgins | 264/9 |
| 4,402,885 | 9/1983 | Roehrig et al. | 264/11 |
| 4,437,883 | 3/1984 | Kubo et al. | 75/0.5 C |

FOREIGN PATENT DOCUMENTS

53-60361  5/1978  Japan ..................... 264/12

Primary Examiner—Jan H. Silbaugh
Assistant Examiner—Mary Lynn Fertig
Attorney, Agent, or Firm—Michael H. Laird; G. Wirzbicki

[57] ABSTRACT

A process and apparatus useful for preparing a porous, particulate sulfur by combining a coherent molten sulfur stream with a coherent water stream to provide an aqueous slurry of a porous, particulate sulfur having a uniform particle size distribution. In the process, a molten sulfur stream is passed through a substantially downwardly oriented, rectangular slot to provide a sheet of molten sulfur, and said sheet of molten sulfur is sheared by directing at least one sheet of water thereat, at a velocity and flow rate sufficient to disrupt said sheet of molten sulfur and provide solid sulfur particles having a substantially uniform size. The solid sulfur particles are recovered, as an aqueous slurry thereof, and separated from said slurry by substantially removing the water therefrom. An apparatus for carrying out the above process, including a novel molten sulfur lift for elevating the molten sulfur to a height sufficient to provide a head pressure of at least 2 feet of sulfur at the downwardly oriented, rectangular slot.

11 Claims, 4 Drawing Sheets

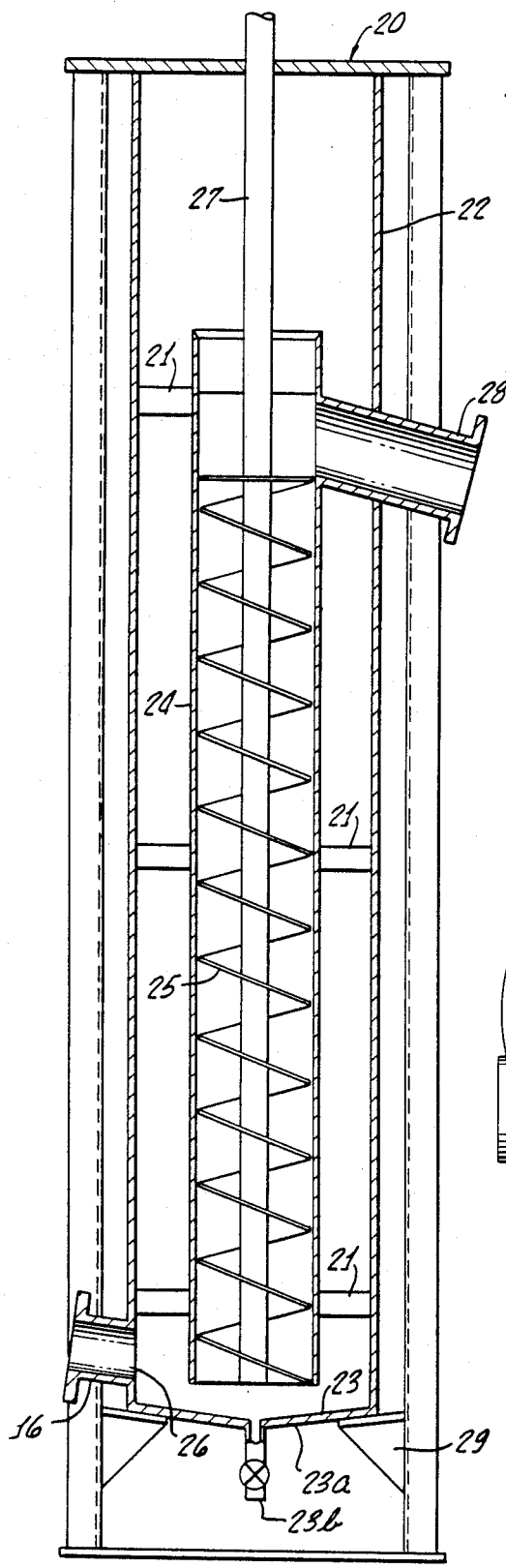
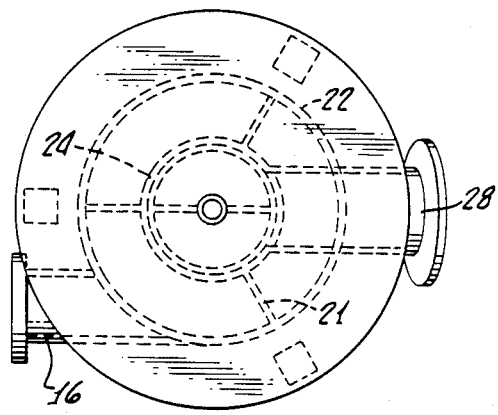
FIG. 2.
FIG. 3.

PROCESS FOR PREPARING SULFUR HAVING UNIFORM PARTICLE SIZE DISTRIBUTION

This application is a continuation of application Ser. No. 811,655, filed Dec. 19, 1985, now abandoned, which is a division of application Ser. No. 678,633, filed Feb. 14, 1985, now U.S. Pat. No. 4,595,350.

BACKGROUND OF THE INVENTION

1. Field of the Invention

This invention relates to a process and apparatus for the production of particulate sulfur, having a substantially uniform particle size, from molten sulfur.

2. Background of the Art

Elemental sulfur may be obtained by the Frasch Process wherein air and superheated water, at a temperature above 119° C., is injected into subterranean sulfur deposits to melt the sulfur and force it to the surface. Elemental sulfur may also be obtained in large quantities from hydrogen sulfide contained in petroleum refinery gas streams or well head gas. The elemental sulfur is generally transported to field storage or distribution sites in the molten state. The molten sulfur at the field distributing plant may be pumped onto concrete pads open to the atmosphere or into enclosed storage bins, e.g. slip forms, for storage whereupon the molten sulfur solidifies into large slabs. (The slip form may be continuously raised as the sulfur solidifies; therefore blocks of extensive height may be formed utilizing a form of limited height.) The slabs of sulfur must be mechanically broken up for final distribution to the consumer. This operation is cumbersome and entails much labor and expense, and without extensive grinding, the resulting sulfur, in the form of relatively large chunks, is difficult to handle and utilize.

Molten sulfur may be solidified into small prills by employment of "prilling towers" such as shown in U.S. Pat. No. 3,334,159; however, the installation of such towers at distribution sites is costly and is not normally economically justified. In addition, the sulfur prill, obtained from the conventional prilling operation, is a dense, hard bead. This "conventional" sulfur prill may be compared to the more desirable porous prill obtained by use of the inventions described in U.S. Pat. Nos. 3,637,351, 3,769,378, 3,830,631; 4,133,668; 4,302,237 and 4,326,875.

U.S. Pat. No. 3,830,631 is directed to an apparatus wherein molten sulfur and water streams are discharged from separate conduits into intimate admixture in the atmosphere. The sulfur is solidified into porous particles and the momentum of the combined streams is sufficient to convey the sulfur to a desired location on a storage pad. It is stated that this apparatus is useful in conveying molten sulfur from tanks of a truck or tankcar to a storage site for delivery to consumers. While the process and product of this patent are improvements over the particulate sulfur products, and processes for the preparation thereof, found in the prior art, there are certain improvements thereto that would be desirable. For example, a more uniform particle size would be desirable. Moreover, the area required for the process disclosed in the patent might be too great for installation in certain locations. In fact, since the area required for the patented process is fairly large, the process is generally practiced outdoors, whereby wind conditions and other environmental factors may adversely affect the process. In some instances the process may have to be terminated if the wind velocity carries the particulate sulfur product out of the area devoted to practicing the process of the patent. Furthermore, the apparatus utilized in the process of the patent is not modular; therefore the site must undergo extensive preparation for installing such apparatus. Finally, the capital costs associated with handling molten sulfur in the patented process are extensive.

Therefore, one object of the instant invention is to provide an improved process and apparatus for the production of particulate sulfur, having a uniform particle size.

Another object is to provide an apparatus for the preparation of particulate sulfur, from molten sulfur, which is of such simplicity that it can readily be made available in modular form so that it can be placed on site (with minimal site work), connected to utilities, and operated to unload molten sulfur truck and rail transports.

Another object is to reduce the capital costs associated with preparing particulate sulfur from molten sulfur, by eliminating conventional equipment incidental to handling molten sulfur, e.g. steam boilers, steam traced pipelines, pumps and storage pits.

Another object is to utilize the sensible heat of molten sulfur to supply the required amount of heat to the sulfur handling equipment utilized in the handling of the molten sulfur.

Another object is to provide a molten sulfur lift to unload sulfur from rail and truck transports.

Another object is to provide sulfur and cooling water nozzles designed to provide a highly coherent flow and thereby facilitate even quenching and precise shearing of the molten material whereby the resulting particles have a very uniform size distribution.

Further objects and advantages are to provide improved steps, elements, and arrangements thereof in a process effective in accomplishing the intended purposes.

Other objects and advantages of the instant invention will become apparent from a careful reading of the specification.

SUMMARY OF THE INVENTION

Accordingly, the instant invention provides a process and an apparatus for the production of particulate sulfur, having a uniform particle size, by passing a molten sulfur stream through a substantially downwardly oriented, rectangular slot to provide a coherent sheet of molten sulfur, shearing said sheet of molten sulfur by directing, through a rectangular slot, at least one coherent water stream at said sheet of molten sulfur, at a velocity, flow rate and angle sufficient to disrupt said sheet of molten sulfur and provide solid sulfur particles having a uniform size, recovering said solid sulfur particles as an aqueous slurry thereof, and separating said solid sulfur particles from said slurry, e g. by substantially removing water and sulfur particles having a particle size of less than about 20 mesh (U.S. Standard Screen Size), i.e. sulfur fines, therefrom.

An apparatus for carrying out the above process includes a molten sulfur lift, comprising a housing defining a molten sulfur inlet and a molten sulfur outlet and, within said housing, a vertically oriented screw providing means to pass molten sulfur from said molten sulfur inlet to said molten sulfur outlet and thereby elevate said molten sulfur to a height sufficient to provide a head pressure greater than about two feet of sulfur at the downwardly oriented, rectangular slot. A molten sulfur nozzle comprising a housing, defining an inlet for molten sulfur, is in fluid communication with the molten sulfur outlet of said molten sulfur lift. The housing of said molten sulfur nozzle also defines a substantially downwardly oriented rectangular slot providing means to discharge said elevated molten sulfur as a molten sheet of sulfur. A water nozzle comprising a housing defining a rectangular slot for passing water provides means to direct such water stream at said molten sheet of sulfur, at a velocity, rate of flow and angle sufficient to disrupt said molten sheet of sulfur and provide solid sulfur particles having a uniform size. Below said molten sulfur nozzle is a substantially closed tank comprising a housing or shell defining an aqueous slurry outlet and providing means to recover said solid sulfur particles as an aqueous slurry thereof. A separation zone, including a tilted screen, is in fluid communication with said aqueous slurry outlet and provides means to separate sulfur particles from the aqueous slurry. For example, in said separation zone, sulfur particles having a particle size of at least 20 mesh (U.S. Standard Screen Size), may fall from said inclined screen into a sulfur pile, while water and sulfur fines, i.e. a substantial number of the sulfur particles having a mesh size less than 20 (U.S. Standard Screen Size) may pass through said screen and be recycled. The uniform particle size is obtained by providing a coherent sheet of molten sulfur and disrupting said sheet with a coherent sheet of water to thereby quench and shear said molten sulfur and provide rapid and uniform cooling of substantially uniform-sized molten sulfur moieties. For the purpose of this invention the term coherent shall mean that the mass flow of either the molten sulfur or the quench water is substantially uniform across any cross section of the stream. That is, while the mass flow of either the molten sulfur or the quench water across a given cross section will vary greatly when emanating from the orifice of a nozzle (wherein the flow of the molten sulfur or quench water is turbulent upstream from the orifice), when emanating from the tapered nozzle including a rectangular orifice or slot of the instant invention, the mass flow across a given cross-section of the spray does not vary with distance from the orifice.

BRIEF DESCRIPTION OF THE DRAWINGS

The invention will be more readily understood by reference to the drawings wherein like numerals refer to like elements and in which:

FIG. 2 is a longitudinal cross-sectional view of a molten sulfur lift that may be utilized in the practice of this invention;

FIG. 3 is a top view of said molten sulfur lift of FIG. 2;

DETAILED DESCRIPTION OF THE INVENTION

Figure 1:
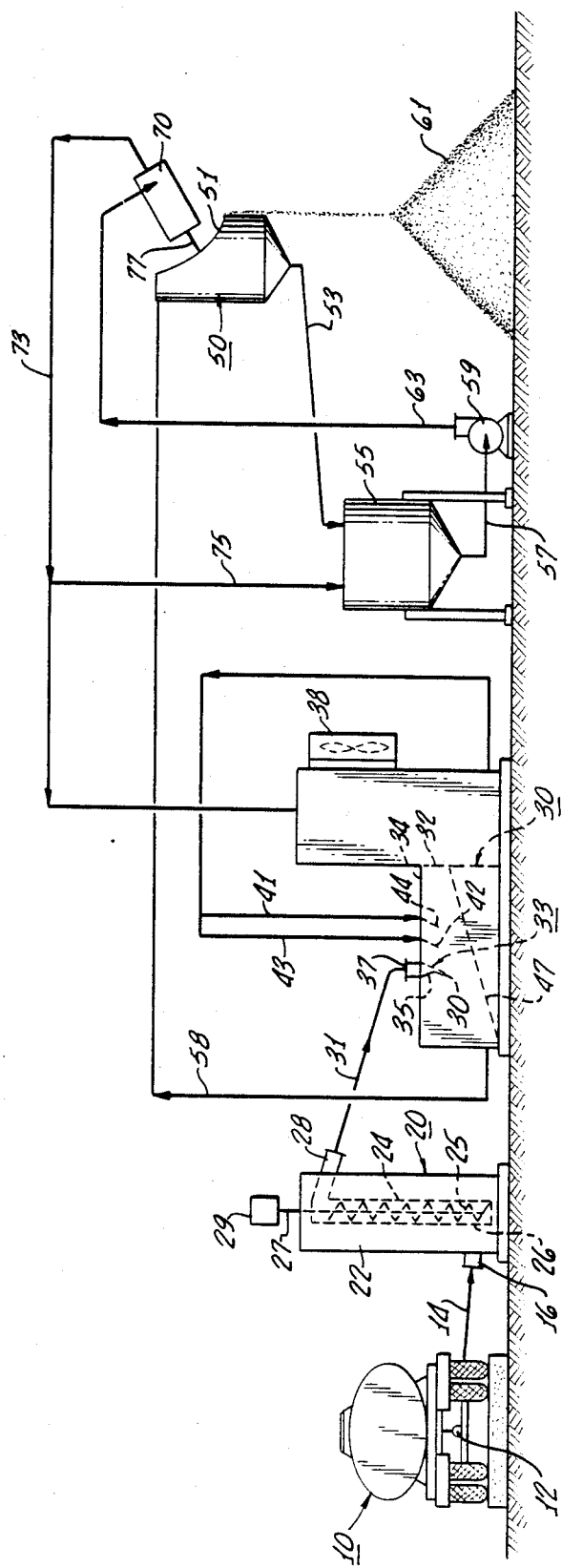
FIG. 1 is a schematic diagram illustrating the process and apparatus of the instant invention.

Referring now to FIG. 1 of the drawings, a storage tank for molten sulfur such as a molten sulfur railroad car or tank truck 10 is fitted with an outlet pipe 12 which defines an exit conduit for molten sulfur and which is adapted to couple to a flexible hose 14. The opposite end of hose 14 is adapted to couple with a pipe 16 which defines an inlet conduit for the novel molten sulfur lift 20 the features of which are shown in detail in FIGS. 2 and 3. As shown, both hose 14 and pipe 16 are slanted to assist in gravity flow of the molten sulfur from tank truck 10 to molten sulfur lift 20.

In general, the molten sulfur lift comprises an outer housing 22 within which is positioned an inner housing 24. Inner housing 24 is a cylindrical housing as may be outer housing 22; however, unlike the outer housing, the inner housing is open at its top and bottom. A lower inlet is provided by a opening 26 in said outer housing at the bottom portion thereof. Said opening 26 is in fluid communication with said pipe 16. An upper outlet for molten sulfur is provided by a pipe 28 extending from the upper portion of the inner housing through the wall of the outer housing. Within inner housing 24 is provided a vertical screw 25 the lower portion of which extends substantially to the open bottom of said inner housing.

Fluid communication between the molten sulfur tank or railroad car and the lower portion of the outer housing is thus provided through outlet pipe 12, hose 14 and pipe 16. Vertical screw 25 which is adapted to be rotated by motor 29 through rotatable shaft 27 will transport molten sulfur from the lower portion within the outer housing upwardly within the inner housing 24. The upper portion of the inner housing is in fluid communication with a fluid conduit 31 through pipe 28. Screw 25 terminates approximately adjacent to the opening defined by the intersection of pipe 28 with the inner housing whereby at least a portion of the molten sulfur, lifted by means of screw 25, is passed from the lower portion within the outer housing through the inner housing 24 to pipe 28 for discharge from the molten sulfur lift 20. The excess of molten sulfur cascades over the open top of inner housing 24 and falls to the lower portion confined by outer housing 22. As the bottom of inner housing 24 is open and spaced from the floor of the outer housing, this excess sulfur may again be carried upwardly by the rotating vertical screw 25.

The sulfur lift of this invention provides a high flow rate with a low head pressure, e.g. at least 2 feet of sulfur, preferably from 2 to 8 feet, e.g. 3 feet, at the rectangular orifice of the sulfur nozzle. Moreover, by recirculating a majority of the molten sulfur and utilizing only a slipstream, the sensible heat of the molten sulfur maintains the sulfur in its molten state, without additional heat input. Also, there are very few close tolerances in the novel sulfur lift; therefore, freezing of the pump by solidifying sulfur is avoided. Finally, the pumping action is achieved by a rotating shaft, which is journaled within a bearing (not shown) above the height of the molten sulfur. This bearing does not contact molten sulfur and therefore, it need not be made liquid-tight or heated to avoid seizing from solidified sulfur.

Again, as more clearly seen in FIGS. 2 and 3, the inner housing 24 is affixed to the outer housing 22 by a plurality of support members 21. Moreover, in its preferred embodiment, the bottom 23 of outer housing 22 is provided with a well 23a, positioned beneath the open bottom of inner housing 24. The molten sulfur from pipe 16 and/or the excess molten sulfur falling from the top of said inner housing flows into well 23a for transport through the open bottom of said inner housing. Upon shutdown the molten sulfur in well 23a may be removed through conduit 23b to avoid freezing in the sulfur lift. Therefore, the molten sulfur lift may be supported above ground level by support members 29, as shown to provide a space, beneath well 23, for a vessel for receiving the molten sulfur. The spaced relationship of the sulfur lift and the ground also reduces the lift required to drain the molten sulfur from the truck 10.

Figure 5:
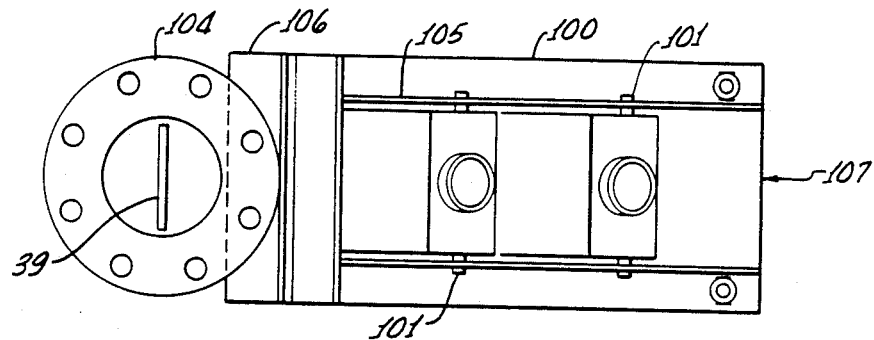
FIG. 5 is a top view of said preferred arrangement of molten sulfur and water nozzles.
Figure 4:
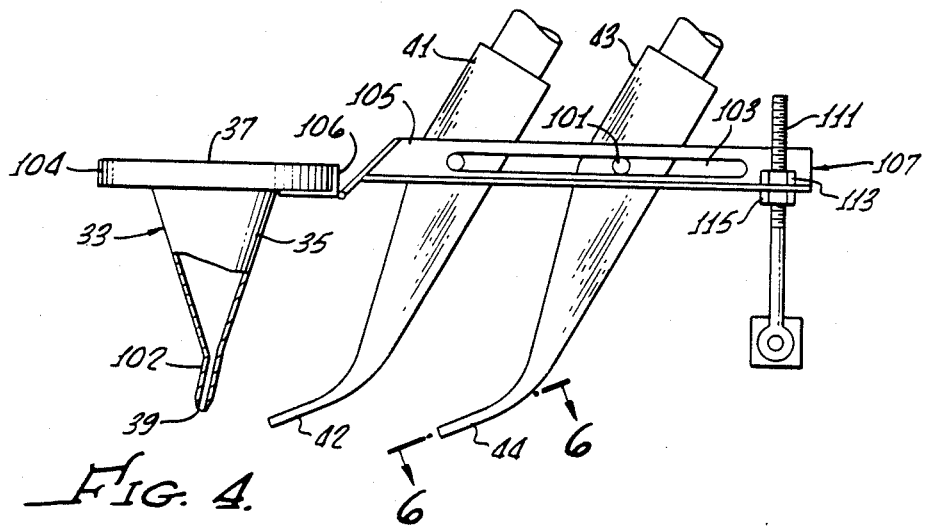
FIG. 4 is a longitudinal, partial cross-sectional view of a preferred arrangement for the molten sulfur and water nozzles.
Figure 6:
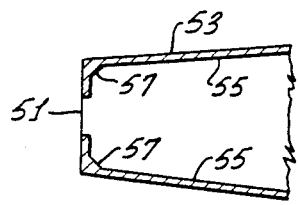
FIG. 6 is partial cross-sectional view of the water nozzle of FIGS. 4 and 5 taken along line 6—6'.

The molten sulfur passes from pipe 28 through conduit 31 to a molten sulfur nozzle 33 the features of which are clearly seen in FIGS. 4, 5, and 6. Molten sulfur nozzle 33 comprises a housing 35 defining an inlet for the molten sulfur 37 and a downwardly-located rectangular slot 39. As shown, the molten sulfur nozzle is shaped as a funnel which is flattened at the discharge end and terminates with a rectangular tip 102 oriented from the vertical to provide a downwardly located rectangular slot. The length to width ratio of the rectangular slot may be 10:1 to 30:1, e.g. 20:1. The molten sulfur is discharged through said slot 39 by gravity and exits as a coherent sheet of molten sulfur. The molten sulfur nozzle may be oriented to discharge a molten sulfur stream at an angle of from about 0° to 30° from the vertical. Preferably the sulfur stream is discharged at an angle of from 15° to 25° from the vertical. The funnel is affixed to a flange 104 about its large opening. This flange is secured to hinged member 106 which is utilized to secure the molten sulfur nozzle to the water nozzle holder 100 described below.

Water inlet conduits 41 and 43 terminate in water nozzles 42 and 44, respectively, through which are discharged water quench streams at an angle of from 30 to 60° from the vertical to intersect the molten sheet of sulfur at an angle of from 15° to 30°. The water nozzles are placed one behind the other to provide separate quench streams intersecting the molten sulfur stream at the same angle but at two points along the substantially downward pathway thereof. The water is discharged from said water nozzles at a rate and velocity sufficient to disrupt the molten sheet of sulfur and provide solid sulfur particles as an aqueous slurry below said nozzle 39. The water streams are sized to be at least equal in width to the width of the molten sulfur stream at the point of intersection and are preferably at least 1 inch wider than the molten sulfur stream. This sizing will ensure that substantially all of the molten sulfur is subjected to the sam disruption and cooling forces.

As shown in FIGS. 4 and 5, the water nozzles 42 and 44 are supported by a water nozzle holder which comprises a plate 107 and ribs 105 affixed thereto. The water nozzles have side studs 101 which extend through longitudinal slots 103 in ribs 105 of the nozzle holder 100. As shown, the ribs extend from plate 107 which is hinged at one end to flange 104 of the molten sulfur nozzle through hinged member 106. The water nozzles 42 and 44 are laterally adjustable along said slot 103 and may be rotated about the axis of said studs 101 to provide any suitable arrangement of water quench streams for intersecting the downwardly discharged molten sulfur stream. Plate 107 may also be adjusted vertically by bolt 111 and nuts 113 and 115 to change the vertical orientation of the water quench streams.

It is important to design both the molten sulfur nozzle and the quench water nozzle(s) to obtain coherent fluid flow. Therefore, as shown in FIG. 6 the nozzles are shaped to provide a fluid pathway which continuously decreases in cross section from upstream point 53 to orifice 51. As the fluid pathway is decreased, the turbulent fluid layers near the internal walls 55 of the nozzle are realigned, increasing the coherency of the fluid traveling in the center of the nozzle to exit at the orifice. The nozzle also comprises beveled surfaces 57 which further ensure a coherent exiting fluid.

The resulting aqueous slurry is discharged toward the inclined floor 47 of tank 30 which, as shown, includes a roof 34 through which both the molten sulfur nozzle and the water nozzles pass to thereby confine the combined molten sulfur and aqueous streams and the resulting aqueous slurry within said tank. Floor 47 is inclined from a slurry outlet 49 positioned at the bottom of a shell 32 which defines said tank 30. Floor 47 slopes upwardly from said slurry outlet 49 whereby the sulfur slurry emanating from the intersection of the molten sulfur sheet and the water streams is directed toward slurry outlet 49 by gravity. Said slurry is removed from tank 30 by a pump, not shown, and passed through fluid conduit 58 to a separation zone 50 for separating the fines and water from particulate sulfur having the desired uniform particle size.

Separation zone 50 comprises an inclined screen 51 over which the aqueous sulfur slurry, discharged from conduit 58, is passed. As shown, the desired uniform particulate sulfur passes overhead screen 51 and falls as dewatered particulate sulfur onto sulfur pile 61. Through screen 51, which is of a mesh size sufficient to pass fines that are less than a desired size, e.g. 20 mesh (U.S. Standard Screen Size), and substantially all of the water contained in said aqueous sulfur slurry, is passed a slurry of sulfur fines and water. This slurry is passed through conduit 53 into tank 55 wherein the sulfur fines are allowed to settle. The settled sulfur fines and water are removed through conduit 57 and passed by means of pump 59 and conduit 63 to solids removal zone 70. Solids removal zone 70 may be a liquid cyclone separator, or the like. In solids removal zone 70 additional water is removed from the sulfur fines and such additional water is returned through fluid conduit 73 to cooling zone 38 (which may be a packed evaporative cooling tower) and ultimately to tank 30 for use in quenching the molten sheet of sulfur. A portion of said removed sulfur fines water may be diverted through conduit 75 back to surge tank 55 for balancing the water levels in the system. Fines exiting solids-removal unit 70 are passed by solids conduit 77 back to screen 51 for agglomeration and recovery as particulate sulfur. The process is operated so that the fines comprise a minor portion of the recovered particulate sulfur.

Figure 7:
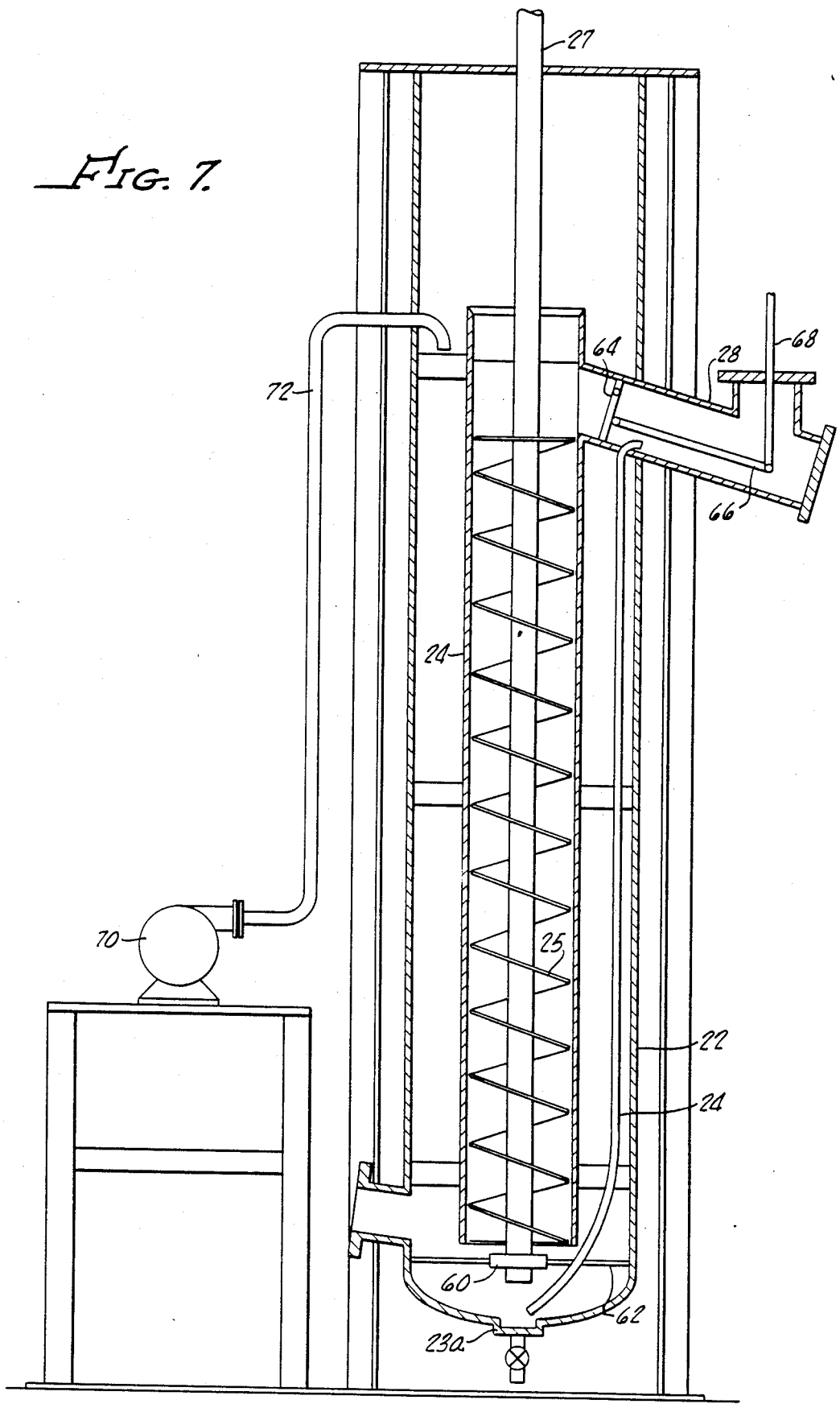
FIG. 7 is a longitudinal cross-sectional view of another molten sulfur lift that may be utilized in the practice of this invention.

An alternative sulfur lift is illustrated in FIG. 7. This alternative sulfur lift may be utilized to convert substantially all of the molten sulfur into a particulate product. That is, upon shut-down there is provided a means to substantially completely pass all of the molten sulfur from the bottom of the sulfur lift to the molten sulfur nozzle.

In the sulfur lift of FIG. 7, the rotatable shaft 27 is journaled into a lower bearing 60 which is affixed to the outer housing 22 by support members 62. The lower bearing restrains the horizontal movement of the screw 25 so that a small tolerance between the inner walls of inner housing 24 and the screw may be provided. In the embodiment of FIGS. 2 and 3 (without the lower bearing 60) horizontal movement during rotation of the screw 25 may require a larger tolerance between the screw and the inner walls of inner housing 24 to avoid contact. Of course, the larger the tolerance between the inner wall and the screw, the less efficient is the transfer of molten sulfur from the bottom of the sulfur lift to discharge pipe 28.

A flapper valve 64 is provided in discharge pipe 28 which is opened by means of connecting arms 66 and 68 during operation. Upon shut-down, to remove substantially all of the molten sulfur from this embodiment of the sulfur lift, the flapper valve 64 is closed (as shown in FIG. 7) and the air blower 70 is activated. The air is passed into the sulfur lift by conduit 72 to pressurize the internal volume of the sulfur lift and push the molten sulfur from the bottom well 23a through conduit 74 which is in fluid communication with the discharge pipe 28 downstream from the flapper valve 64. Thus, in this embodiment, substantially all of the molten sulfur may be removed from the sulfur lift and utilized to make particulate sulfur.

The invention is further illustrated by the following example which is illustrative of a specific mode of practicing the invention and is not intended as limiting the scope of the appended claims.

EXAMPLE

An apparatus according to FIG. 1 is assembled and utilized as follows: A truck 10, discharges molten sulfur by gravity through a flexible hose 14 which, as shown, is inclined to enable gravity feed into pipe 16 located at the base of the molten sulfur lift 20. The molten sulfur lift contains an electrically driven vertical screw 25 used to continuously raise the molten sulfur to an elevation sufficient to provide a head pressure. The molten sulfur lift supplies a uniform flow under constant pressure to the molten sulfur nozzle 33 with varying inlet pressure. The sulfur flow rate is 60 to 90 gpm with very low head pressure e.g. 3 feet of sulfur, at the molten sulfur nozzle. Excess sulfur is bypassed by cascading over the inner housing 24, confining the vertical screw. To prevent freezing, more molten sulfur is elevated by the molten sulfur lift than is supplied to sulfur nozzle 33. The heat from this excess of molten sulfur ensures that the molten sulfur will not freeze upstream of said sulfur nozzle. The molten sulfur lift also does not require liquid shaft seals since the motor for the rotatable screw and bearings are above the molten sulfur level.

After exiting from the molten sulfur lift, the molten sulfur is discharged through pipe 28, which is also inclined to allow gravity feed and enters sulfur nozzle 33. The molten sulfur is discharged from said sulfur nozzle through downwardly located rectangular slot 39. Upon discharge, a coherent molten sulfur sheet is intersected with at least one coherent high velocity water stream emanating from rectangular slots 42 and/or 44. The rectangular slot 44 may be positioned to contact the molten sulfur sheet below the level of the sulfur slurry in mixing tank 30. In this arrangement the water stream emanating from slot 44 serves to push the slurry toward the slurry outlet 49. The molten sulfur is thereby quenched and sheared to form the particulate solid as an aqueous slurry. After separation of particulate sulfur from said slurry, as described above, it is found that the solids are uniform in size as demonstrated in the comparison of Table 1 below to an average of the results summarized in Table IV of U.S. Pat. 3,830,631. The particle size can be changed by adjusting the water liquid flow rate and angle of impingement That is, increasing either the velocity of the quench water or the angle of the intersection of the quench water and the molten sulfur will increase the shearing action and thereby decrease the average partical size of the sulfur.

To separate the particulate sulfur from the aqueous slurry, the following steps may be carried out: The particulate sulfur is pumped, as a slurry in a substantially closed loop system, to an overhead separation screen, such as screen 51. (Because a liquid, i.e. water, is used to transport the sulfur, particulate emissions or disruption of operation due to wind are eliminated.) The particles are spread out on said screen in a thin sheet to a width of about six feet, to permit removal of process water and facilitate mechanical drying.

The water, separated from said particulate sulfur, is returned to the initial process stream after passing through a packed evaporative cooling tower. The tower removes sufficient heat to allow continuous production of product.

TABLE 1

| SULFUR PARTICLE SIZE DISTRIBUTION | | | | | | | | | |
|---|---|---|---|---|---|---|---|---|---|
| Tyler mesh | U.S. Pat. No. 3,830,631 Table IV | | | | | | | | |
| Size | 4 | 6 | 8 | 10 | 14 | 20 | 50 | 100 | 200 |
| % retained on screen: Average of Eight Samples in Table IV | 18.6 | 21.8 | 22.9 | 14.8 | 10.9 | 6.6 | 2.7 | 1.0 | .5 |

| | New Process | | | | | | |
|---|---|---|---|---|---|---|---|
| Tyler Mesh Size | 4 | 6 | 8 | 20 | 60 | 100 | −100 |
| % retained on screen Average of three Samples | .7 | 2.8 | 11.9 | 66.3 | 16.9 | .8 | .1 |

While particular embodiments of the invention have been described, it will be understood, of course, that the invention is not limited thereto since many obvious modifications can be made in the invention. For example, while water is described as a suitable and preferred quenching medium for the molten sulfur, it will be apparent that other fluid media may be used. Additional media for quenching molten sulfur include the hydrocarbons disclosed in U.S. Pat. No. 4,133,668, entitled "Multicomponent Soil Supplement," by D.C. Young, which is herein incorporated by reference in its entirety. In addition, various micronutrients may be incorporated into the sulfur particles by following the teachings of said U.S. Pat. No. 4,133,668. Finally, either of the embodiments of the abovedescribed molten sulfur lift may be used to elevate or pump other molten materials, with the same advantages of providing a high flow rate with a low head pressure, and enjoying seizure-free operation by means of the sensible heat of the molten material and the design of the lift. It is intended to include within this invention any such modifications as will fall within the scope of the appended claims.

Having now described the invention, we claim:

1. A process for preparing particulate sulfur, having a uniform particle size, which comprises:
    (a) passing a molten sulfur stream through a substantially downwardly oriented, rectangular slot to provide a coherent sheet of molten sulfur, (b) shearing said coherent sheet of molten sulfur by contacting at least one coherent sheet of water with said coherent sheet of molten sulfur at a velocity, flow rate an angle sufficient to disrupt said coherent sheet of molten sulfur and provide solid sulfur particles having a substantially uniform size and of which a majority passes No. 8 U.S. Standard Screen and is retained on No. 20 U.S. Standard Screen, said water sheet having a width at least equal to the width of said sulfur sheet, (c) recovering said solid sulfur particles as an aqueous slurry thereof, and (d) separating said solid sulfur particles from said slurry by substantially removing water therefrom.

2. The process of claim 1 wherein said coherent sheet of molten sulfur is discharged from said rectangular slot at a pressure of at least 2 feet of sulfur, and said rectangular slot has a length to width ratio of about 10:1 to about 30:1.

3. The process of claim 2 wherein said coherent sheet of sulfur is discharged at an angle of from 15° to 25° from the vertical.

4. The process of claim 3 wherein said molten sulfur sheet is at a temperature of at least 245° F.

5. The process of claim 4 wherein said water stream is at a temperature of less than about 110° F.

6. The process of claim 5 wherein said aqueous slurry is screen to separate a substantial portion of the solid sulfur particles having a particle size of 20 mesh or greater from sulfur fines having a mesh size of less than 20 and said water.

7. The process of claim 6 wherein said sulfur fines are separated from said water and said separated water is returned to step (b).

8. The process of claim 1 wherein said coherent sheet of molten sulfur is discharged from said rectangular slot at a head pressure of from two to eight feet of sulfur.

9. A process for preparing particulate sulfur, having a uniform particle size, which comprises:

(a) passing a molten sulfur stream through a substantially vertically oriented, rectangular slot to provide a coherent sheet of molten sulfur, (b) shearing said coherent sheet of molten sulfur by contacting at least one coherent, liquid sheet with said coherent sheet of molten sulfur at a velocity and flow rate sufficient to disrupt said coherent sheet of molten sulfur and provide solid sulfur particles having a substantially uniform size and of which a majority No. 8 U.S. Standard Screen and is retained on No. 20 U.S. Standard Screen, said liquid sheet having a width at least equal to the width of said sulfur sheet, and (c) recovering said solid sulfur particles.

10. The process of claim 9 wherein said fluid stram comprises a hydrocarbon and said solid sulfur particles are recovered as a hydrocarbon slurry thereof.

11. A process for preparing particulate sulfur having a substantially uniform particle size from molten sulfur, which comprises:

(a) elevating said molten sulfur to a height sufficient to provide a head pressure of about 2 to about 8 feet of molten sulfur, (b) discharging said elevated molten sulfur, at a head pressure of at least about two feet of sulfur, through a substantially downwardly oriented rectangular slot to provide a coherent sheet of molten sulfur, (c) shearing said coherent sheet of molten sulfur by contacting at least one coherent sheet of water with said coherent sheet of molten sulfur at a velocity, angle and flow rate sufficient to disrupt said coherent sheet of molten sulfur and provide solid sulfur particles having a uniform size and of which a majority passes No. 8 U.S. Standard Screen and is retained on No. 20 U.S. Standard Screen, as an aqueous slurry, said water sheet having a width at least equal to the width of said sulfur sheet, and (d) recovering said particulate sulfur from said slurry.

* * * * *